United States Patent [19]

Carlsen

[11] Patent Number: 5,550,907
[45] Date of Patent: Aug. 27, 1996

[54] PERSONAL COMMUNICATION USING INTELLIGENT TERMINALS

[75] Inventor: Ralph Carlsen, Port Monmouth, N.J.

[73] Assignee: Lucent Technologies Inc., Murray Hill, N.J.

[21] Appl. No.: 363,496

[22] Filed: Dec. 23, 1994

[51] Int. Cl.$^6$ .......................... H04M 3/42; H04M 11/00; H04M 7/00

[52] U.S. Cl. .............................. 379/207; 379/63; 379/92; 379/211; 379/220; 379/230

[58] Field of Search ................................ 379/93, 94, 201, 379/207, 211, 212, 58, 59, 100, 60, 63, 219, 220, 221, 229, 230, 91, 92

[56] References Cited

U.S. PATENT DOCUMENTS

| | | | |
|---|---|---|---|
| 4,313,035 | 1/1982 | Jordan et al. | 179/18 |
| 4,956,861 | 9/1990 | Kondo | 379/211 X |
| 5,243,645 | 9/1993 | Bissell et al. | 379/211 |
| 5,315,636 | 5/1994 | Patel | 379/63 X |

OTHER PUBLICATIONS

Bellcore Technical Reference TR-NWT-000030, issue 2, Oct. 1992, "Voiceband Data Transmission Interface Generic Requirements".

W. Stallings, "Networking Standards: A Guide to OSI, ISDN, LAN and MAN Standards"—Cover, Table of Contents, and Chapter 1 attached.

*Primary Examiner*—Jeffery Hofsass
*Assistant Examiner*—Harry S. Hong
*Attorney, Agent, or Firm*—Barry H. Freedman; Brian K. Dinicola

[57] ABSTRACT

An intelligent terminal (which can be a telephone, a facsimile machine, or similar device) is arranged so that (a) it can store information indicating when (e.g., date and time) a particular subscriber last was present at the terminal, and (b) the stored information can be retrieved from the terminal remotely, preferably without completing a conventional call to the terminal. A central processor contains, for each subscriber, a list of the intelligent terminals that have been pre-designated for use by that subscriber, and has the ability to query terminals on the list. In response to a call placed to the subscriber by dialing the subscriber's unique personal number, specific intelligent terminals on that subscriber's list are queried by the central processor to determine when the subscriber was last present at each terminal. The central processor then generates a control signal such that the call is then completed to the particular terminal that was most recently visited by the subscriber.

25 Claims, 5 Drawing Sheets

| 601 | 602 | 603 | 604 | 605 |
|---|---|---|---|---|
| PERSONAL NUMBER | LOGIN CODE | TERMINALS TO BE POLLED | COMMUNICATIONS LINK USED | X.25 ADDRESSES |
| 500-288-1234 | #1 | 908-949-7503 | SS7/Q.931 | |
| | | 908-123-4567 | SS7/ADSI | |
| | | 609-787-9876 | X.25 | 3134 1234567890 |
| | | 609-234-7643 | GSM/SMS | |
| | | 908-949-9876 | X.25 | 3134 5678901234 |
| | | 908-949-3214 | X.25 | 3134 9012345678 |

| PERSONAL NUMBER ⌐601 | LOGIN CODE ⌐602 | TERMINALS TO BE POLLED ⌐603 | COMMUNICATIONS LINK USED ⌐604 | X.25 ADDRESSES ⌐605 |
|---|---|---|---|---|
| 500-288-1234 | #1 | 908-949-7503 | SS7/Q.931 | |
| | | 908-123-4567 | SS7/ADSI | |
| | | 609-787-9876 | X.25 | 3134 1234567890 |
| | | 609-234-7643 | GSM/SMS | |
| | | 908-949-9876 | X.25 | 3134 5678901234 |
| | | 908-949-3214 | X.25 | 3134 9012345678 |

FIG. 7

| LOGIN CODE ⌐701 | DAY OF YEAR ⌐702 (1 TO 365) | TIME OF DAY ⌐703 (00:00 TO 24:00) |
|---|---|---|
| #1 | 273 | 9:25 |
| #8 | 273 | 13:47 |
| 33 | 272 | 10:00 |

5,550,907

PERSONAL COMMUNICATION USING INTELLIGENT TERMINALS

FIELD OF THE INVENTION

This invention relates generally to personal communication, facilitated by the use of intelligent terminals, in which a telephone call (which can be a facsimile call) placed to a personal telephone number assigned to a subscriber (rather than to a telephone line) is completed to that person (or a facsimile machine) at any of several locations where the subscriber is likely to be at the time the call is made.

BACKGROUND OF THE INVENTION

Personal communications as described in U.S. Pat. No. 4,313,035 issued to Jordan et al. on Jan. 26, 1982, contemplates routing of a telephone call placed to a personal telephone number assigned to a subscriber to any of several locations where the subscriber is likely to be at the time the call is made. This can be done by querying a database that contains information that indicates where (i.e., at what telephone number) the subscriber intends to be. The profile can be updated in accordance with a fixed schedule or rule, such that calls are sent to different destinations based on the time of day. The problem with this is that the subscriber may not always maintain the intended schedule. Alternatively, a profile can be maintained by the subscriber having the personal telephone number, and the profile can be updated as required, by calls made to the database. However, this requires specific action by the subscriber, and the subscriber may forget to update the profile.

One solution was presented in U.S. Pat. No. 5,243,645 issued to Bissell et al. on Sep. 7, 1993, in which the profile is updated automatically, based upon transactions, such as credit card purchases, made by the subscriber. This solution does not require explicit action by the subscriber, but nevertheless requires transmission of updating information to the database on a periodic basis, before a call is ever made to the subscriber. Various call forwarding schemes exist which let a subscriber program station equipment with a schedule of destinations where the subscriber may be reached. Such station equipment, and the procedure used to program the equipment, are often unduly complicated and hard to understand.

SUMMARY OF THE INVENTION

In accordance with the present invention, an intelligent terminal (which can be a telephone, a facsimile machine, or similar device) is arranged so that (a) it can store information indicating when (e.g., date and time) a particular subscriber last was present at the terminal, and (b) the stored information can be retrieved from the terminal remotely, preferably without completing a conventional call to the terminal. A central processor contains, for each subscriber, a list of the intelligent terminals that have been pre-designated for use by that subscriber, and has the ability to query all terminals on the list.

In response to a call placed to the subscriber by dialing the subscriber's unique personal number (which could be a "500" number), specific intelligent terminals on that subscriber's list are queried by the central processor to determine when the subscriber was last present at each terminal. The central processor then controls routing of the call to the particular terminal that was most recently visited by the subscriber.

In one embodiment of the invention, the central processor is a Service Control Point (SCP)in the Public Switched Telecommunications Network (PSTN). Intelligent terminals contemplated by the present invention can be wired or wireless, analog or digital, and can use a variety of signaling techniques to allow a query and response without completion of a conventional call. For example, cellular telephones conforming to the GSM standard can already transmit and receive data messages from base stations, and analog telephones can be suitably modified to use the Analog Display Services Interface (ADSI) already proposed by Bellcore to facilitate voice and data communications with a terminal. See Bellcore Technical Reference TR-NWT-000030, Issue 2, October, 1992 and particularly section 2.3.2. ISDN phones are also particularly well suited for use in connection with this invention, because they can use the X.25 data communications feature on the D channel. See Networking Standards by William Stallings, January, 1993, ISBN 0-201-56357-6.

The present invention allows a subscriber to "login" on any predetermined intelligent terminal and automatically receive calls at that terminal until a login thereafter occurs at some other intelligent terminal. Since the login function can only be done at a set of predetermined terminals, security problems are minimal. Each intelligent terminal can be arranged to store information for several subscribers, who are differentiated by their login code. For example, if up to 10 subscribers may use a given intelligent terminal in conjunction with the present invention, the login code used by each subscriber can be as simple as a single digit. However, a more reliable login would occur if each person used 2 digits (e.g., #X), where # is a special, non-numeric key and X is a digit from 0 to 9. Note here that "login dialing" that uses only a single digit is differentiated from "ordinary dialing" by the fact that "login dialing" is done while the phone is on-hook. If additional differentiation is desired, the login code could, as indicated above, include a special character (e.g. the "#" character) as a prefix, or the entry of the login code could be preceded by the actuation of a "login key" on the intelligent terminal.

In one application of the present invention, a subscriber has a unique personal number in the form 500-NNX-XXXX and a login code #1. Upon arrival at the office, the subscriber dials #1 on the intelligent terminal used for business calls, while driving home the subscriber dials #1 on a cellular phone, and upon reaching home, the subscriber dials #1 on an intelligent terminal designed for residential use. In all cases, any person dialing the subscriber's personal 500 number would be automatically connected to the terminal on which the #1 was last dialed by the subscriber.

BRIEF DESCRIPTION OF THE DRAWINGS

The present invention will be more fully appreciated by consideration of the following detailed description which should be read in light of the accompanying drawing in which.

DETAILED DESCRIPTION

Figure 1:
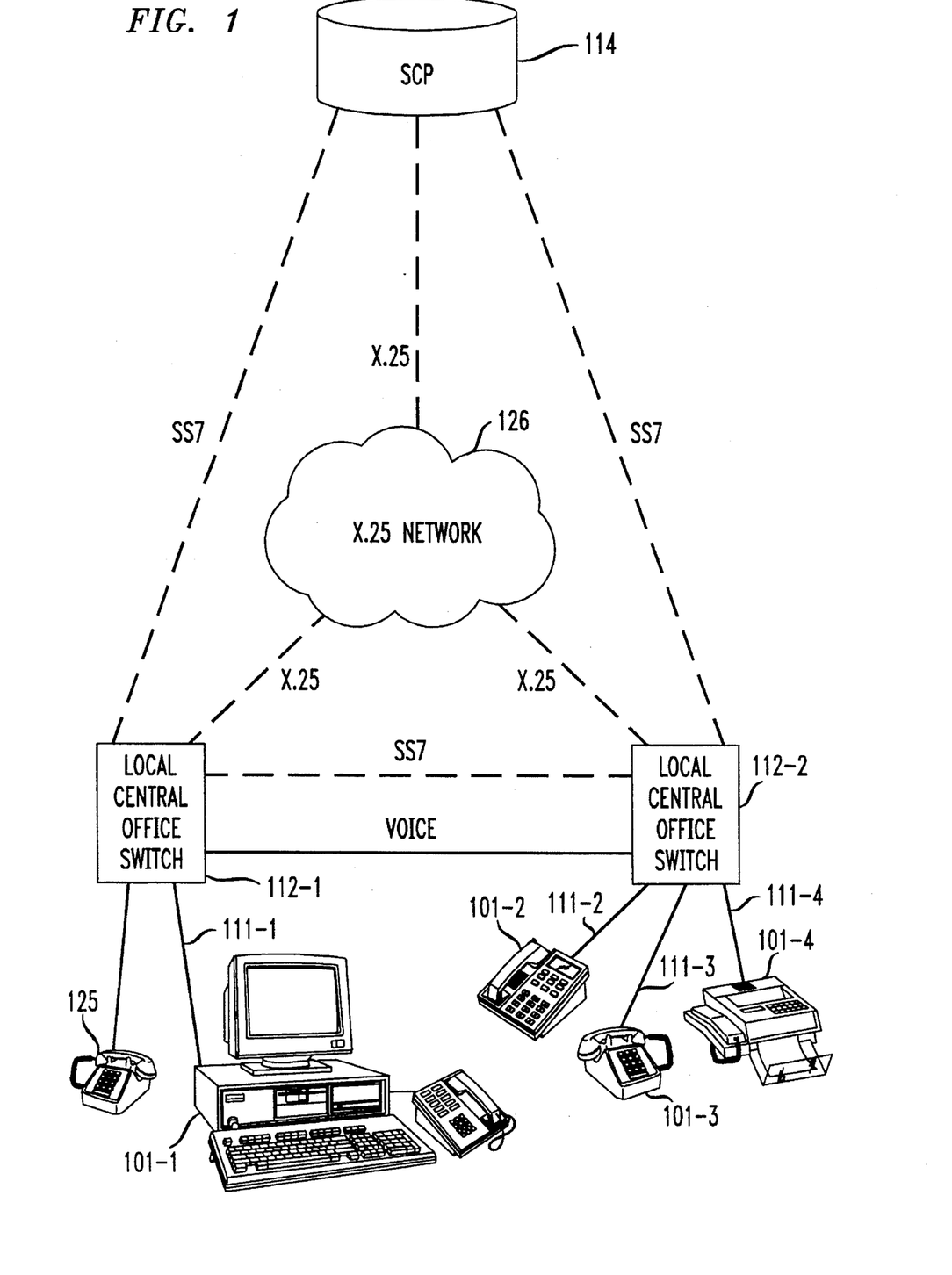
FIG. 1 is a block diagram of the overall network arrangement by which a group of intelligent terminals are interconnected via the local telephone network to an SCP which performs the search processor function in order to accomplish the objectives of the present invention.

Referring first to FIG. 1, there is shown a block diagram of the overall network arrangement by which a group of intelligent terminals are interconnected with a Service Control Point (SCP) which performs the search processor function in order to accomplish the objectives of the present invention. This figure shows an intelligent network in which local central office switches 112-1 and 112-2, which are typically part of the public switched telephone network (PSTN), are interconnected with each other and with SCP 114 by signaling links which carry messages using the well known Signaling System 7 (SS7) protocol. SCP 114 is basically a database which responds to queries from switches 112-1 and 112-2, and provides routing information used by the switches to complete calls. SCP 114 can also be linked to switches 112-1 and 112-2 by a standard X.25 packet data network 126.

A group of intelligent terminals 101-1 to 101-4 are connected to respective local central office switches 112-1 or 112-2, illustratively by (a) ISDN Basic Rate Interface (BRI) connections 111-1 and 111-2 to workstation 101-1 and terminal 101-2, respectively, or (b) by conventional local loop connections 111-3 and 111-4 to telephone 101-3 and facsimile machine 101-4, respectively. Other types of connections and other types of terminals may also be used, as long as signaling between switches 112 and terminals 101 can be effected with the terminals in an on-hook state, as described more fully below. For the purposes of describing operation of the system of FIG. 1, a calling telephone 125 is also shown connected to switch 112-1 via a conventional local loop connection.

Figure 2:
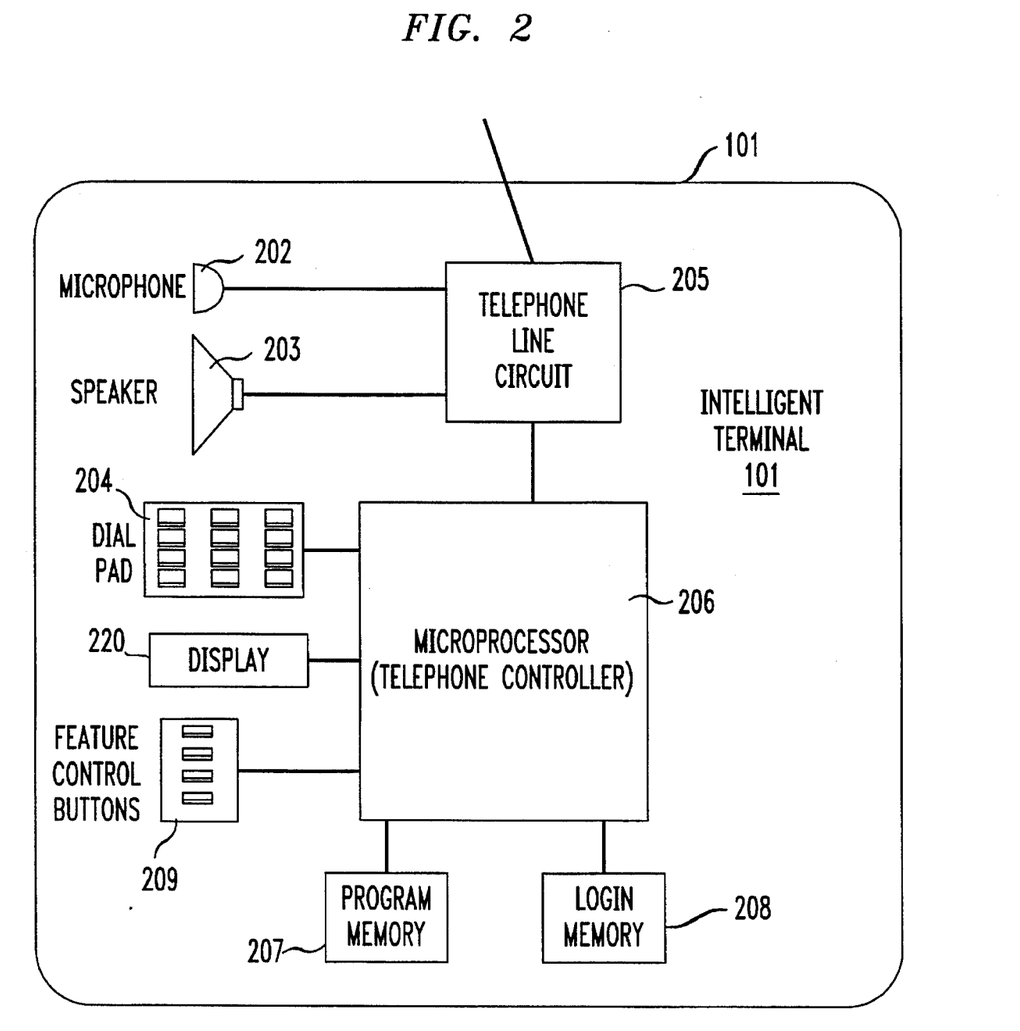
FIG. 2 is a block diagram of one of the intelligent terminals 101 of FIG. 1.

FIG. 2 is a block diagram of some of the components in one of the intelligent terminals 101 of FIG. 1. As indicated above, these terminals can be wired or wireless telephones, facsimile machines, workstations, or other terminal devices that are capable of receiving incoming calls and messages. The components not shown in FIG. 2 are specific to the type of terminal involved. Thus, a facsimile machine would include apparatus for scanning documents, for printing output, and for performing other document related functionality; a cellular telephone would have a mobile identification number memory, radio transmitter and receiver sections, and so on.

In FIG. 2, the conventional components are similar to those shown in FIG. 2 of copending application Ser. No. 08/285,370 filed on Aug. 3, 1994 on behalf of applicant and assigned to the same assignee as the present invention. Specifically, intelligent terminal 101 includes a telephone line circuit 205, a microphone 202, a speaker 203, a dial pad and associated touch tone generator 204, and feature control buttons 209, one of which may be a "login" button discussed below. Terminal 101 also includes a microprocessor 206 arranged to operate under the control of program instructions stored in a program memory 207, which thereby controls the operation of those various components and performs the process described below in connection with FIG. 4.

Figure 7:
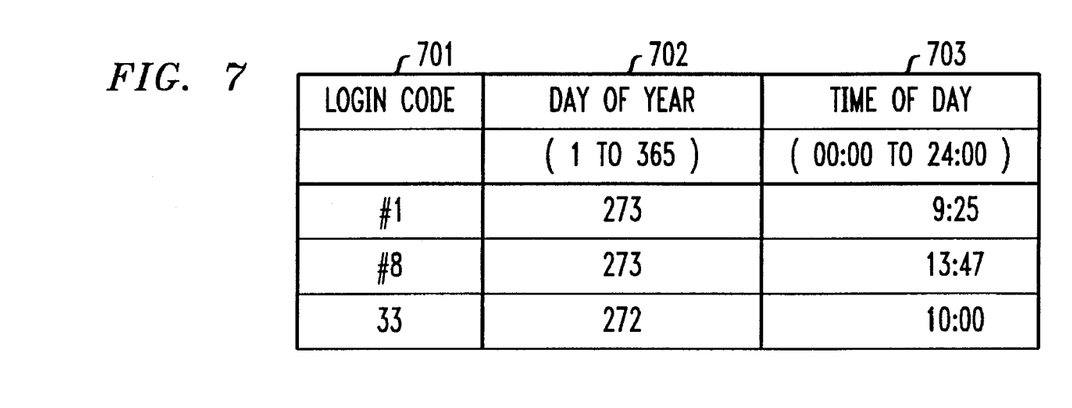
FIG. 7 illustrates the typical format of records stored in login memory 208 in the intelligent terminals 101 shown in FIG. 2.

In accordance with the present invention, each terminal includes, in additional to the conventional components, a display 220, which may be an LCD display, and a login memory 208 that can store records of the type shown in FIG. 7 on a long term basis, and which may be any type of random access memory in which can be stored information indicating when a particular subscriber last was present at the terminal. The terminal is arranged so that the stored information in memory 208 can be retrieved remotely, preferably without completing a conventional call to the terminal. Such retrieval may be accomplished by sending a data message to the terminal, requesting the terminal to generate a return message indicating, for example, the date and time stored in the login memory 208 in association with a login code assigned to a particular subscriber. The login code is described more fully below, in conjunction with FIG. 4. Microprocessor 206 includes an internal clock, so that once the time and date are correctly set, the current date and time can be stored in login memory 208 in association with other information.

Communications to and from the terminals 101 may be accomplished using data messages transmitted over network 126 using the X.25 protocol. Alternatively, the query and retrieval process could be implemented over the conventional telephone signaling network, using SS7 Transaction Capability Applications Part (TCAP) messages, as long as switches 112 are capable of this signaling.

If terminals 101 are cellular phones, two way messaging service is preferably implemented between X.25 network 126 and the phone, for example, using the Cellular Digital packet Data (CDPD) service currently being introduced into AMPS service. This arrangement is preferred, because intelligent cellular terminals could use CDPD for other data services. The GSM standard used in Europe, Australia and other countries includes both a short messaging service (160 characters), and data communications, either of which can also be used.

If terminals 101 are workstations, they can be implemented by a personal computer with telephone line circuit hardware and software. The telephone service can be equivalent to either an analog phone or an ISDN phone.

If terminals 101 are analog phones, the technology currently used to send the number of the calling party to a ringing analog phone could be adapted to provide for a query and response capability contemplated by the present invention. This technology has already been extended by Bellcore to communicate with intelligent terminals, in connection with what is called the Analog Display Services Interface (ADSI). While that interface is currently envisioned for alternate voice and data in an active call mode, it could be modified to signal the phone (as in the current calling party identification) but would not ring the phone. If terminals 101 are ISDN phones connected to the local central office on BRI facilities, the D channel would be used to send login data to SCP 114 in response to a query from that SCP. Depending on the capabilities of the local central office, this can be done as either direct X.25 communications between SCP 114 and terminal 101, or as ISDN messages. If ISDN messages are implemented, they would be sent in the Q.931 format between terminal 101 and the local central office. The local central office would convert the Q.931 messages into TCAP messages for transmission over the SS7 network to the SCP.

Figure 3:
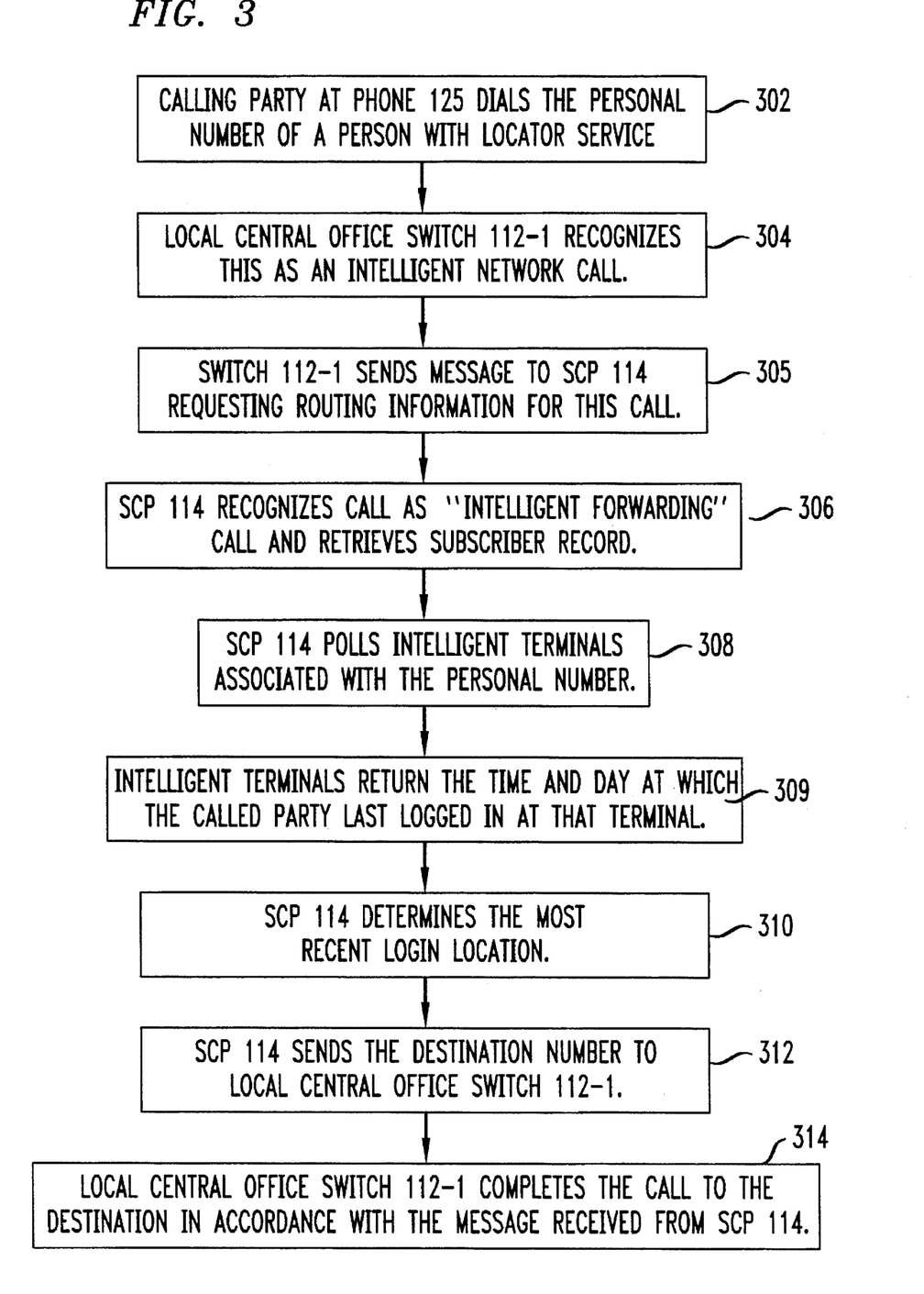
FIG. 3 is a flow chart of the process by which a call is completed to a subscriber using the arrangement of FIG. 1 and terminals of the type shown in FIG. 2.

Referring now to FIG. 3, there is shown a flow chart of the process by which a call is initiated from telephone 125 and completed to a subscriber using the arrangement of FIG. 1 and terminals of the type shown in FIG. 2. First, in step 302, the calling party dials the personal number of a subscriber having the "intelligent forwarding" service contemplated by the present invention. The call is handled by the local central office switch serving the originating telephone, in this case switch 112-1, and is recognized, in step 304, as a call requiring "intelligent network" treatment. This recognition (called a "trigger point") may be based upon the fact that the personal number has a format, such as 500-NNX-XXXX, that has the "500" special service designator in place of a conventional NPA. Alternatively, the local central office switch may be arranged with trigger points to query a database to determine the treatment to be afforded to all calls, based upon other portions of, or the entire dialed number.

In step 305, switch 112-1 sends a SS7 TCAP query message to SCP 114 requesting routing information for the call. This request may also be sent as an X.25 data message via X.25 network 126, depending upon the specific implementation of the invention.

In step 306, the query message is received by SCP 114 and recognized as a query relating to "intelligent forwarding" as provided by the present invention. This is accomplished by a look-up or data retrieval operation in SCP 114, which associates the subscriber's dialed number with the service (e.g. intelligent forwarding) that is provided in connection with calls placed to that number. SCP 114 retrieves the record, described further below, in connection with FIG. 6, associated with the subscriber, in order to determine the identity of the intelligent terminals that are to be queried for this subscriber in order to complete this call.

In steps 308 and 309, SCP 114 polls or queries the intelligent terminals identified in step 306 and receives responding messages indicating the time (and day) at which the subscriber last logged in to each of the intelligent terminals. The type of messages sent in connection with the queries and responses depend upon the type of terminals involved. As stated previously, for GSM cellular telephones, the messages may be in the short message service format. For conventional telephones and facsimile machines, the messages may be consistent with the ADSI protocol. For ISDN terminals (telephones or personal computers) signaling can be either SS7 TCAP or X.25. The method used is specified in the database described in connection with FIG. 6. In all cases, the query message will identify both the end point terminal and the SCP. The response message returned to the SCP will identify the terminal from which it was sent.

When all of the responses have been received, SCP 114 determines, in step 310, which of the queried terminals has the most recent login. In this step, provisions may be made for resolving the situation where one or more terminals do not respond within a predetermined time after the transmission of a query. Information identifying the terminal with the most recent login is transmitted to local central office switch 112-1 in step 312, using the same type of message communication used in step 305. When the information is received in switch 112-1, it is used in step 314 to complete the call. In this way, the call is intelligently forwarded to the particular one of the intelligent terminals most recently "visited" by the subscriber.

Figure 4:
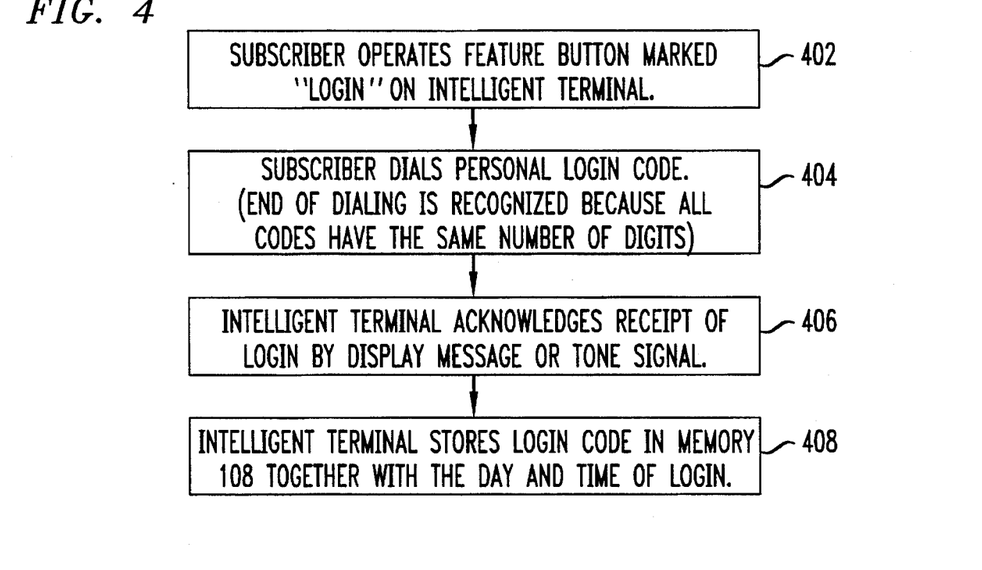
FIG. 4 is a flow chart showing how an intelligent terminal is used by a subscriber to login at that terminal.

FIG. 4 is a flow chart showing how an intelligent terminal is used by a subscriber to login at that terminal. First, in step 402, a subscriber actuates one of the feature control buttons 209, illustratively a button marked "login" if the phone is so equipped. Otherwise, the subscriber leaves the phone on hook and proceeds to dial a login code as described below. The actuation of a login button is detected by microprocessor 206, and in response thereto, microprocessor 206 is prepared to receive the personal login code entered by the subscriber in step 404. Illustratively, the login code is entered as a series of keystrokes using the keys on dial pad 204. The login code associated with each subscriber can be a sequence #X, where X is a digit 0 to 9.

In step 406, the intelligent terminal acknowledges the entry of a login code by causing a suitable message to be displayed on display 220. If there is an error in processing, this condition may also be indicated by a message on display 220. At the same time or shortly thereafter, the login code and the date and time that the login occurred are stored in login memory 208. The format of records in login memory is described below, in connection with FIG. 7.

Figure 5:
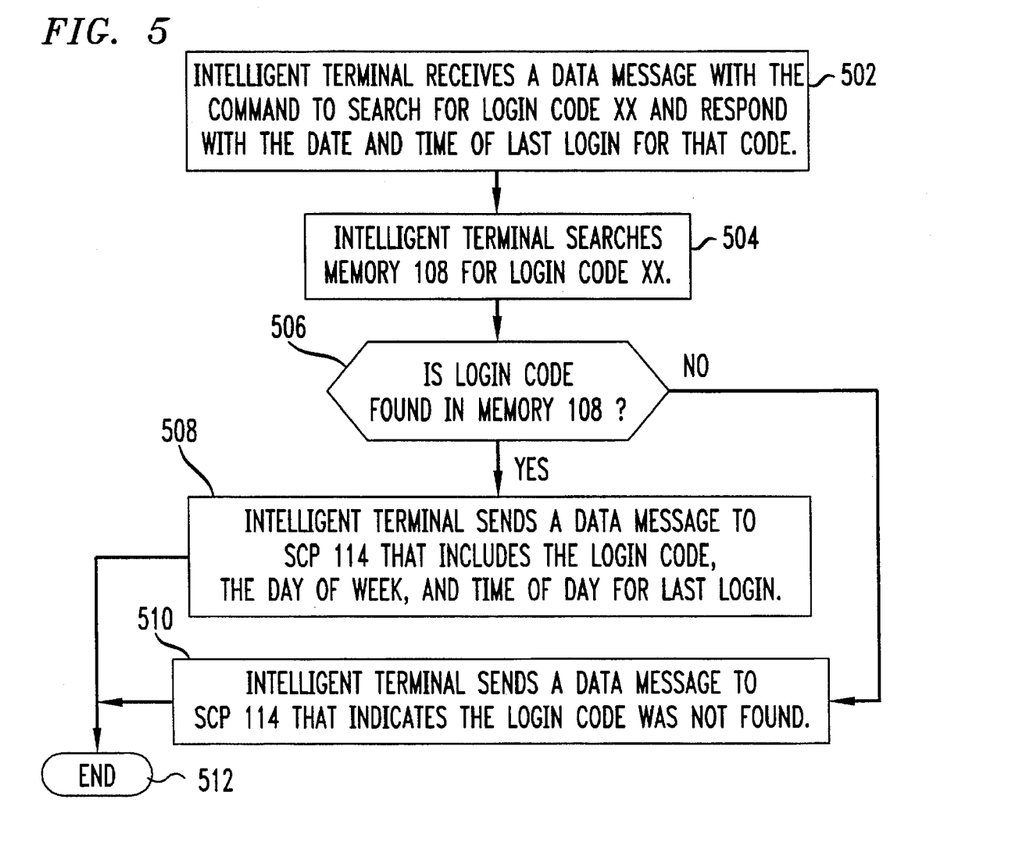
FIG. 5 is a flow chart showing how an intelligent terminal is queried by SCP 114 of FIG. 1.

Referring next to FIG. 5, there is shown a flow chart of the process by which an intelligent terminal is queried by SCP 114 of FIG. 1. First, in step 502, a terminal receives a data message from SCP 114 commanding the terminal to search its log in memory for the date and time that is stored in association with a particular login code, and to return information indicating that date and time to the SCP. As indicated previously, this data message may be transmitted to a terminal in a number of formats, depending upon the specific type of terminal involved. Illustratively, the query will be via an X.25 message transmitted using X.25 network 126.

In step 504, the terminal receiving the query determines if there is information stored in login memory 208 corresponding to the login code that accompanied the query. If a YES result occurs, the intelligent terminal sends a data message to SCP 114 that includes the login code, and the day and time that is associated with that login code, in step 508, and the process terminates in step 512. On the other hand, if a NO result occurs in step 506, the intelligent terminal sends a data message to SCP 114, in step 510, indicating the login code was not found, and again, the process terminates in step 512.

Figure 6:
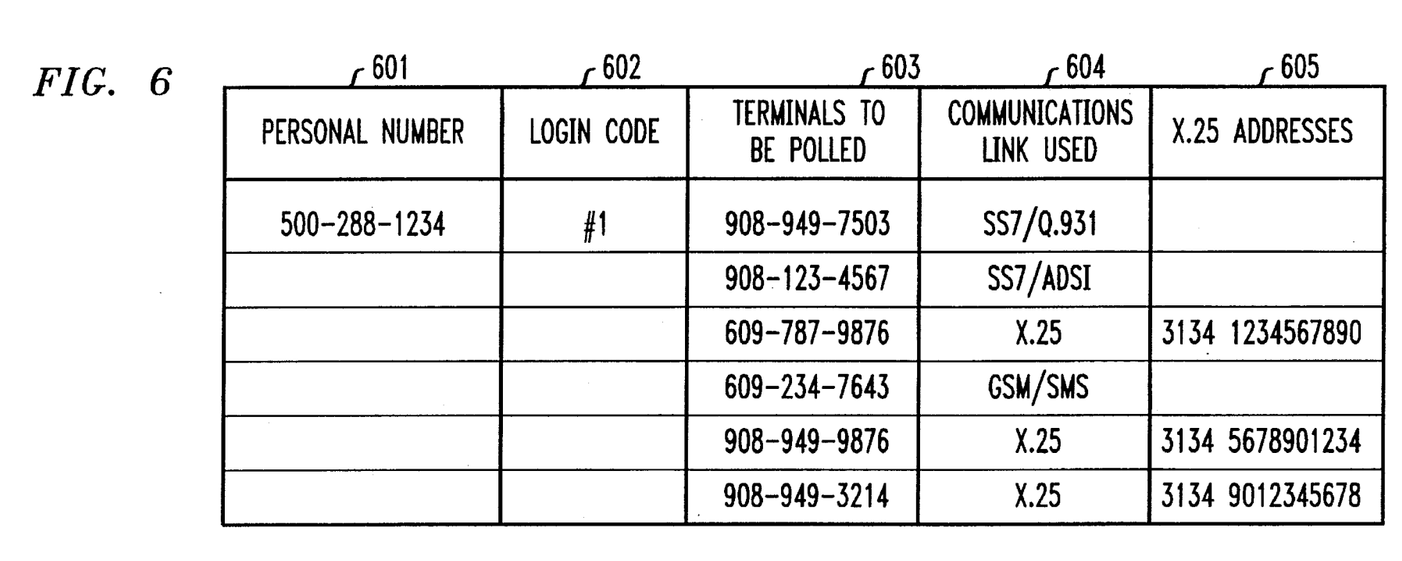
FIG. 6 illustrates the typical format of records stored in SCP 114 of FIG. 1 for each subscriber.

FIG. 6 illustrates the typical format of records stored in SCP 114 of FIG. 1 for each subscriber. Each subscriber has a personal telephone number, typically a number in the 500-NNX-XXXX format described above. This number is stored in field 601. For each subscriber, fields 602-605 contain information associated with several intelligent terminals at which the subscriber may login. Field 602 contains the login code used by this subscriber. For each terminal, field 603 contains the address to which messages destined for that terminal may be addressed. Field 604 indicates the communications link used for this terminal. In the case of messages using the X.25 protocol, the address (which is different from the telephone number) is shown in field 605. Normally, the information in field 603 would be a conventional telephone number in the form NPA-NXX-XXXX, where NPA is an area code, NXX is an exchange (where N is a digit 2–9), and XXXX are any digits. In the example of FIG. 6, the subscriber uses the same login code of #1 at all of the terminals. This arrangement is preferred, so that the login code is easy to remember and use. The login code is shown as 2 digits, with the first digit fixed as #. This gives the capability of up to 10 people logging in on the same intelligent terminal. If greater capacity is required, the first digit can be made variable to include all digits 0–9 plus # and * which would increase the number of people that can login to the same terminal to 120. Using 3 digit codes of the form XXX, where X is any digit 0–9, would permit up to 1000 people to login on the same terminal.

FIG. 7 illustrates the typical format of records stored in login memory 208 in the intelligent terminals 101 shown in FIG. 2. Field 701 contains the login code for each subscriber that may receive calls at that terminal. For each login code, there is an associated date (i.e., day of year) set forth in field 702, and a time (e.g., in military time from 00:00 to 24:00) in field 703 representing the date and time that the particular subscriber last logged in to that terminal.

A series of options can be implemented with the present invention. For example, if none of the login dates are current, the calls can be completed to a default number where there might be an answering machine, a voice mailbox, a pager, or an announcement can be played indicating that the "called party cannot be located".

The present invention (unlike the conventional method of call forwarding) avoids the "trombone routing" that can happen when the call goes to a fixed point from which call forwarding takes place. This invention finds the final location before any routing is started. If "trombone routing" can be tolerated, the present invention may be practiced using a personal computer (PC) or a private branch exchange (PBX) to perform the functions of SCP 114 and originating switch 112-1 that were previously described above. In such an embodiment, the PC or the PBX would include processing and storage elements to perform the functions of the central processor, and a switching element to perform the call handling functions performed by the originating switch. In this embodiment, a call to a subscriber would initially be completed to the PC or the PBX. The PC or PBX would then query or poll the intelligent terminals associated with the called subscriber to ascertain the login day and time that the called subscriber last visited each such terminal, and complete the call to the selected terminal that has the most recent login.

The login method used by the present invention could also be changed to take advantage of other user interfaces. For example, a phone could have a card swipe slot like AT&T coinless public phones, for reading information encoded on a credit card that would correspond to the login code assigned to a subscriber. Alternatively, a bar code or badge reader could be installed in the intelligent terminal, or voice recognition could be built into the intelligent terminal. Any of these techniques would result in populating the record in the intelligent terminal (as shown in FIG. 7) in the same way as if the subscriber dialed his login code.

That which is claimed is:

1. A method for completing telephone calls placed to a selected one of a plurality of subscribers, each of the subscribers having a personal telephone number, said method including the steps of storing information indicating when each of a plurality of intelligent terminals associated with a selected subscriber was last visited, storing in a central processor, for each respective subscriber, a corresponding list of associated intelligent terminals that have been pre-designated for use by that subscriber, responsive to a call placed to a selected subscriber by dialing said selected subscriber's unique personal number, querying specific pre-designated intelligent terminals on said selected subscriber's list to determine when said selected subscriber was last present at each terminal, said stored information being retrieved from each terminal remotely, without completing a conventional call to the terminal, and completing the call to the particular terminal that was most recently visited by the subscriber.

2. The method defined in claim 1 wherein the intelligent terminal is a telephone, a facsimile machine, or a cellular telephone.

3. The method defined in claim 1 wherein said querying step includes receiving and transmitting signals to said intelligent terminal while said terminal is in an on-hook condition.

4. The method defined in claim 1 wherein said intelligent terminals are queried and respond with messages using the X.25 protocol.

5. The method defined in claim 1 wherein said central processor is a Service Control Point (SCP) in the public switched telephone network.

6. The method defined in claim 1 wherein said completing step is performed by a switch in the public switched telecommunications network.

7. The method defined in claim 1 wherein said central processor includes processing and storage elements in a personal computer and said querying and completing steps are performed in a switching element in said personal computer.

8. The method defined in claim 1 wherein said central processor includes processing and storage elements in a private branch exchange (PBX) and said querying and completing steps are performed in a switching element in said PBX.

9. The method defined in claim 1 wherein each of said intelligent terminals includes a login memory, and wherein said first mentioned storing step includes storing, in the login memory in each of said terminals, information indicating the current date and time when a login code was entered in said terminal while in the on-hook state.

10. The method defined in claim 1 further including retrieving stored information from at least one of said terminals using an Analog Display Services Interface (ADSI) protocol.

11. The method defined in claim 1 wherein at least one of said terminals is an ISDN terminal, and wherein said method includes retrieving stored information from said terminal using the ISDN D channel.

12. The method defined in claim 1 wherein said personal telephone number is a 500 number.

13. A system for completing telephone calls placed to a selected one of a plurality of subscribers, each of the subscribers having a personal telephone number, said system including a plurality of intelligent terminals, each of said intelligent terminals being associated with one of said plurality of subscribers and being arranged (a) to store information indicating when it was last visited by its associated subscriber and (b) to permit remote retrieval of said stored information, without completing a conventional call to the terminal, a central processor containing, for each respective subscriber, a corresponding list of associated intelligent terminals that have been pre-designated for use by that subscriber, said central processor arranged to query said pre-designated intelligent terminals on a selected subscriber's list in order to determine when the selected subscriber was last present at each associated terminal, and calling means responsive to a call placed to the selected subscriber by dialing the selected subscriber's unique personal number for causing said central processor to query said pre-designated intelligent terminals and for completing the call to the particular terminal that was determined to be the terminal most recently visited by the subscriber.

14. The invention defined in claim 13 wherein the intelligent terminal is a telephone, a facsimile machine, a personal computer or a cellular telephone.

15. The invention defined in claim 13 wherein said intelligent terminal includes means for receiving and transmitting signals while in an on-hook condition, using the X.25 protocol.

16. The invention defined in claim 13 wherein said intelligent terminals are queried and respond without completion of a conventional call.

17. The invention defined in claim 13 wherein said central processor is a Service Control Point (SCP) in the public switched telephone network.

18. The invention defined in claim 13 wherein said call handling means is a switch in the public switched telecommunications network.

19. The invention defined in claim 13 wherein said central processor includes processing and storage elements in a personal computer and said call handling means includes a switching element in said personal computer.

20. The invention defined in claim 13 wherein said central processor includes processing and storage elements in a Private Branch Exchange (PBX) and said call handling means includes a switching element in said PBX.

21. The invention defined in claim 13 wherein each of said intelligent terminals includes a login memory, and wherein each of said terminals is arranged to store information indicating the current date and time when a login code is entered in said terminal while in the on-hook state.

22. The invention defined in claim 21 wherein said login memory is arranged to store login information indicating when a plurality of subscribers were last at said terminal.

23. The invention defined in claim 13 wherein stored information is retrieved from at least one of said terminals using an Analog Display Services Interface (ADSI) protocol.

24. The invention defined in claim 13 wherein at least one of said terminals is an ISDN terminal, and wherein stored information is retrieved from said terminal using the ISDN D channel.

25. The invention defined in claim 13 wherein said personal telephone number is a 500 number.

\* \* \* \* \*